US007934685B1

(12) United States Patent
Spanjers

(10) Patent No.: US 7,934,685 B1
(45) Date of Patent: May 3, 2011

(54) METHODS TO ACTIVELY PROTECT SPACECRAFT FROM DAMAGE DUE TO COLLISION WITH IONS

(75) Inventor: Gregory G. Spanjers, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 88 days.

(21) Appl. No.: 11/093,989

(22) Filed: Mar. 30, 2005

(51) Int. Cl.
*B64G 1/54* (2006.01)
*B64G 1/52* (2006.01)
(52) U.S. Cl. ...................................................... 244/171.7
(58) Field of Classification Search ............... 244/171.7, 244/166, 205, 158.1; 250/515.1
See application file for complete search history.

(56) References Cited

U.S. PATENT DOCUMENTS

| 3,984,730 | A | * | 10/1976 | Hunter | 361/218 |
| 5,321,336 | A | * | 6/1994 | Cirri | 315/14 |
| 5,962,850 | A | * | 10/1999 | Wuest | 250/287 |
| 6,332,590 | B1 | * | 12/2001 | Oh | 244/158.1 |
| 6,362,574 | B1 | * | 3/2002 | Aguero et al. | 315/169.3 |
| 6,683,311 | B1 | * | 1/2004 | Wuest | 250/397 |

FOREIGN PATENT DOCUMENTS

GB  2190544 A  * 11/1987

OTHER PUBLICATIONS

"A Study of Inter-Spacecraft Coulomb Forces and Implications for Formation Flying" King, Lyon B., Gordon G Parker, Satwik Deshmukh and Jer-Hong Chong, 2002, AIAA, Paper AIAA-2002-3671.*
Cuthbertson, J. W., Motley, R. W., and Langer, W. D., "High-flux source of low-energy neutral beams using reflection of ions from metal," Rev. Sci. Instrum. 63 (11), Nov. 1992.
Hagstrum, H. D., "Reflection of noble gas ions at solid surfaces," Phys. Rev. 123, 758 (1961.

* cited by examiner

*Primary Examiner* — Tien Dinh
*Assistant Examiner* — Joseph W Sanderson
(74) *Attorney, Agent, or Firm* — Kenneth E. Callahan

(57) ABSTRACT

A technique whereby one or more conducting plates electrically-biased negatively with respect to a spacecraft's electrical potential and insulated from the spacecraft surface are located around the spacecraft surface whereby contaminant ions in a plasma surrounding the spacecraft are accelerated through an electric potential, caused to collide with the conductive surface, neutralized through collisions with surface atoms, and then reflected away from the spacecraft as neutral atoms or molecules.

2 Claims, 6 Drawing Sheets

US 7,934,685 B1

METHODS TO ACTIVELY PROTECT SPACECRAFT FROM DAMAGE DUE TO COLLISION WITH IONS

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The invention relates generally to a method of shielding a spacecraft from damaging collisions with ions, and in particular to electrically-biased, high-Z material reflectors used to actively neutralize and redirect incident ions away from the spacecraft.

A major issue in the design of spacecraft is the mitigation of the effects of damaging contamination. The three primary sources of contamination of interest are: deposition of foreign material on the spacecraft surface; erosion of spacecraft surface material through collision with foreign material; and changes to the electrical potential on, or in the vicinity of, the spacecraft via the collection of electrically charged foreign material.

There are a multitude of effects that can arise as a result of spacecraft contamination. For example, contamination to optical surfaces can degrade imaging capability or reduce the power production capability of solar arrays. Contamination to thermal surfaces can change the thermal balance of the spacecraft. Eventually the concomitant changes in the spacecraft operating temperature can damage electronics. Contamination from electrically charged material can result in spacecraft electrical failures or the electrical shorting of the power-generating solar arrays.

There are seven primary sources of contaminant ions (see FIG. 1): ions from the space plasma in the vicinity of the spacecraft; neutrals in the ambient space atmosphere ionized through collision or ultra-violet (UV) radiation from the sun; neutrals out-gassed from the spacecraft becoming ionized; neutrals exhausted from spacecraft thrusters that become ionized through collision or UV radiation; high-energy Ions exhausted from spacecraft thrusters on a direct impingement trajectory with spacecraft surfaces; slow ions near the thruster exit plane that are formed through charge-exchange collisions with ambient neutrals or neutrals from the thruster; and neutrals sputtered from spacecraft surfaces due to ion impingement. These neutrals can then become ionized through collision or UV and accelerate back into the spacecraft surface.

Once these ions are in the vicinity of the spacecraft (within about 4 Debye lengths), they will be accelerated into the spacecraft surface due to an electric potential difference between the spacecraft and the surrounding plasma. This acceleration will give the ion sufficient energy to sputter away spacecraft material causing contamination in the form of erosion. These sputtered neutrals can also form new ions, thereby self-fueling the ion contamination process.

A source of ions that deserves specific attention is ions emitted from the spacecraft propulsion system. As an example, consider the case where the source of the contaminant ions is an on-board Hall-effect plasma thruster. The thruster will act to accelerate xenon ions to about 300 eV. Ideally these ions will travel in a straight trajectory away from the spacecraft without collision. In reality these ions will be accelerated in a cone with about a 45-degree half angle and have slightly curved trajectories in response to collisions with other fast ions or interactions with the earth's magnetic field. These ions will also experience a substantial number of charge-exchange collisions with neutral xenon gas at the thruster exit plane. These collisions result in a fast neutral xenon atom and a slow xenon ion.

The fast ions generally affect the spacecraft through direct impingement on surfaces, which can cause material sputtering and spacecraft charging. The state-of-the-art method to preclude this fast ion impingement is to place the thrusters so that the plume will not directly impinge a critical surface. This is a major hindrance to spacecraft operation. For example, the xenon ion thrusters used for stationkeeping on geosynchronous communications satellites would optimally be directed north and south. Instead the thrusters are canted away from the north-south direction as much as 45 degrees to avoid direct impingement of the plume on spacecraft surfaces. This cant angle decreases the effective thrust delivered in the required direction by about 30%, which means that the spacecraft must carry additional propellant to offset the thrust loss.

The slow ions would seem to be less of a concern due to their lower kinetic energy. However, they are more prevalent in the critical region near the spacecraft, and their low kinetic energy makes them more likely to be accelerated back into the spacecraft by the local electric field. There is no demonstrated state-of-the-art method to avoid the contamination from these slow ions. The spacecraft designer must instead increase the beginning-of-life specifications for critical capabilities such as power generation and thermal control, so that the spacecraft retains sufficient operating capability at end-of-life. The impact of the added capability at beginning-of-life is added mass in non-revenue-generating components.

One method for actively shielding the spacecraft from contaminant ions uses a series of baffles between the exit plane of the plasma thruster and critical spacecraft components. The baffles use a louvered design to force an incoming ion to collide with the baffle surface. No electrical bias is applied to the baffles. The baffles are designed solely to be a material block between the contaminant source and selected critical areas of the spacecraft.

The NASCAP (NASA Charging Analysis Code) and similar development under AFRL and NASA have considered related spacecraft charging effects. NASCAP is used to predict spacecraft charging due to the space environment. As part of this analysis NASCAP calculates the electric potential of the spacecraft, which is primarily determined by surface area and solar array voltage. In its analysis, NASCAP does consider the effect of this spacecraft charging on the trajectories of local ions and electrons. Further, NASCAP has undoubtedly been used to predict changes in the ion and electrons trajectories (and therefore changes in the spacecraft ion impingement) caused by changing the spacecraft electrical potential. However, the NASCAP work has never considered the unique concepts disclosed herein whereby electrically-biased, high-Z materials can be used to actively neutralize and redirect incident ions away from the spacecraft. NASCAP is an analysis tool that may, however, be helpful in the detailed design of the disclosed concept.

SUMMARY OF THE INVENTION

Ion collisions can cause several deleterious effects on spacecraft surfaces, such as deposition, erosion, contamination, charging and sputtering. The present invention is used to actively protect spacecraft from damaging collisions with ions. One or more conducting plates are positioned about the spacecraft surface. They are electrically-biased negatively with respect to a spacecraft's electrical potential and insulated from the spacecraft surface. Contaminant ions in plasma surrounding the spacecraft are accelerated through the electric potential, caused to collide with the conductive surface, neutralized through collision with surface atoms of the conductors, and then reflected away from the surface as neutral atoms or molecules.

BRIEF DESCRIPTION OF THE DRAWINGS

For a more complete understanding of the present invention, and further advantages thereof, reference is now made to the following detailed description taken in conjunction with the drawings in which.

DESCRIPTION OF THE PREFERRED EMBODIMENT

Figure 1:
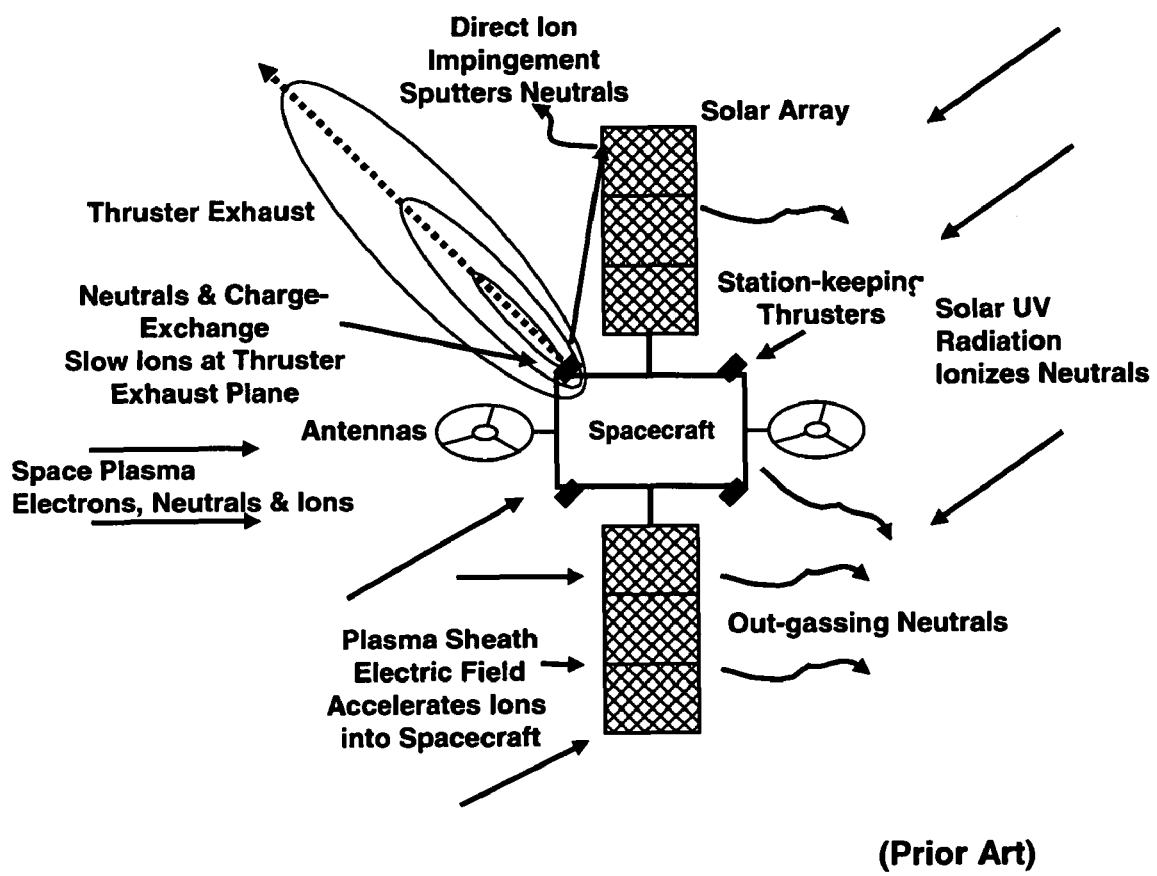
FIG. 1 is a diagram showing the major sources of contaminant ions in the vicinity of a spacecraft (prior art).
Figure 2:
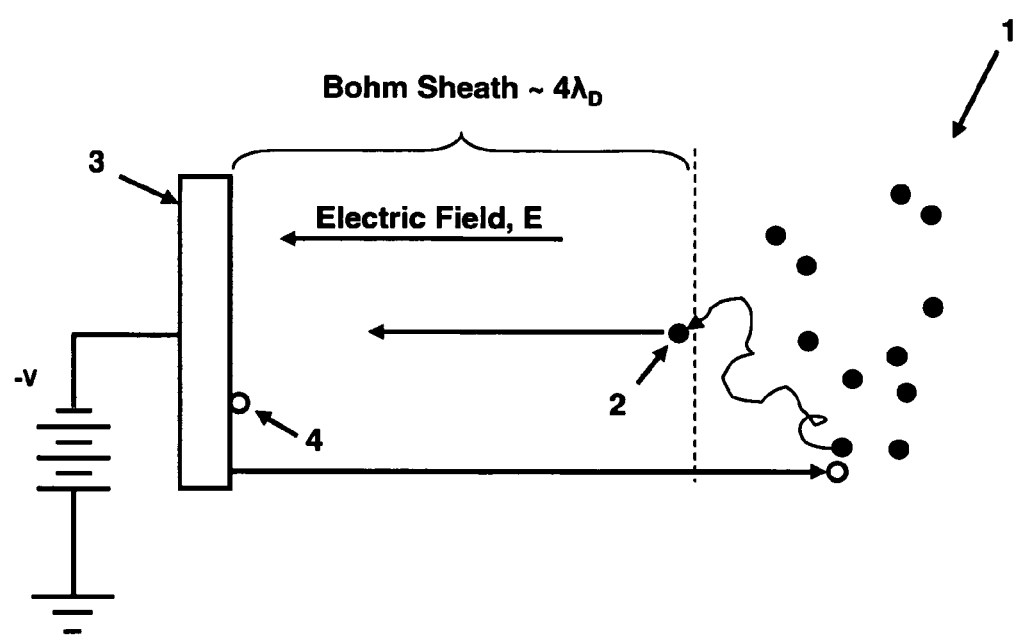
FIG. 2 shows the neutralization and reflection of ions from a biased high-Z surface (prior art).

FIG. 2 shows the basic process whereby electrically-biased, high-Z materials can be used to actively neutralize and redirect incident ions away from the charged surface. At a distance beyond the Bohm sheath of about 4 Debye lengths, there exists a plasma of ions with thermal drift 1. As one the these plasma ions 2 drifts into the Bohm sheath space, the ion will experience an electric field E that will act to accelerate it towards the biased surface of the high-Z conductor 3. This electric field will generally appear between 1 and 4 Debye lengths ($\lambda_D$) from the biased surface:

$$\lambda_D = (kT/4\pi n e^2)^{1/2} \quad (1)$$

where k=Boltzman constant, T=Temperature, n=plasma density, and e=elementary charge constant.

The specific distance is dependent on plasma parameters such as degree of ionization, temperature, and density. The larger distance, $4\lambda_D$, is roughly the length of the Bohn sheath observed in the partially ionized plasmas of plasma processing or glow discharges. Once the ion enters the sheath, it will accelerate towards the surface, acquiring an incident kinetic energy equal to:

$$E_{inc} = E_0 + ZeV, \quad (2)$$

where V is the bias voltage relative to the space plasma potential, Z is the ionization state of the ion, and $E_0$ is it's original kinetic directed energy towards the biased surface.

Approaching the conductive surface, the ion 4 in FIG. 2 can be neutralized, primarily by one of two processes: resonance and Auger neutralization (Hagstrum, H. D., "Reflection of noble gas ions at solid surfaces," Phys. Rev. 123, 758 (1961)). If the incoming ion has an ionization potential large compared to the work function of the metal, one of these processes is very likely to occur. Resonance neutralization is a 1-electron process where an electron in the conduction band of the metal tunnels into an excited energy level of the nearby ion. Auger neutralization is a two-electron process. One electron tunnels from the metal to the ground state of the nearby ion. The concomitant release of potential energy excites a second metal electron from another level into the conduction band. With sufficient release of potential energy, this electron may be ejected from the metal, appearing as secondary electron emission. Both the resonance and Auger neutralization occur within a few angstroms of the surface. Therefore, the incoming ion has accelerated through the full sheath potential before neutralization, and is moving with a kinetic energy described by Equation 2.

Following the neutralization process, the neutral atom will be reflected from the solid surface due to collision. The nature of this collision varies with the incident kinetic energy. For the cases considered here, the ions approach with at least the kinetic energy acquired in the potential drop of the Debye sheath. At these energies, the collision can be treated as a series of binary collisions, with an energy correction due to the stopping power of the electrons in the metal. The net effect is that an ion entering the plasma sheath with a kinetic energy well below the sheath potential will neutralize and be reflected approximately normal to the surface. For the case where the conductor atoms are much heavier than the incoming ion, the neutral will be reflected with a kinetic energy slightly less than the sheath potential. For ions with mass equivalent or less than the atoms in the conductive plate, the reflected kinetic energy is reduced, as expected for a collision process that is similar to a classical elastic collision. Note that once neutralized, the neutral kinetic energy is no longer affected by the electric field of the Debye sheath.

This technique has been shown to be quite efficient in neutralizing ions to create a highly-directional neutral beam. In experiments by Cuthbertson (Cuthbertson, J. W., Motley, R. W., and Langer, W. D., "High-flux source of low-energy neutral beams using reflection of ions from metal," Rev. Sci. Instrum. 63 (11), November 1992), the reflection of low-energy ions from surfaces was used to produce high-flux beams of low-energy neutral particles. High speed beams of neutral atoms are used in earth-based applications for material processing and in physics experiments.

Figure 3:
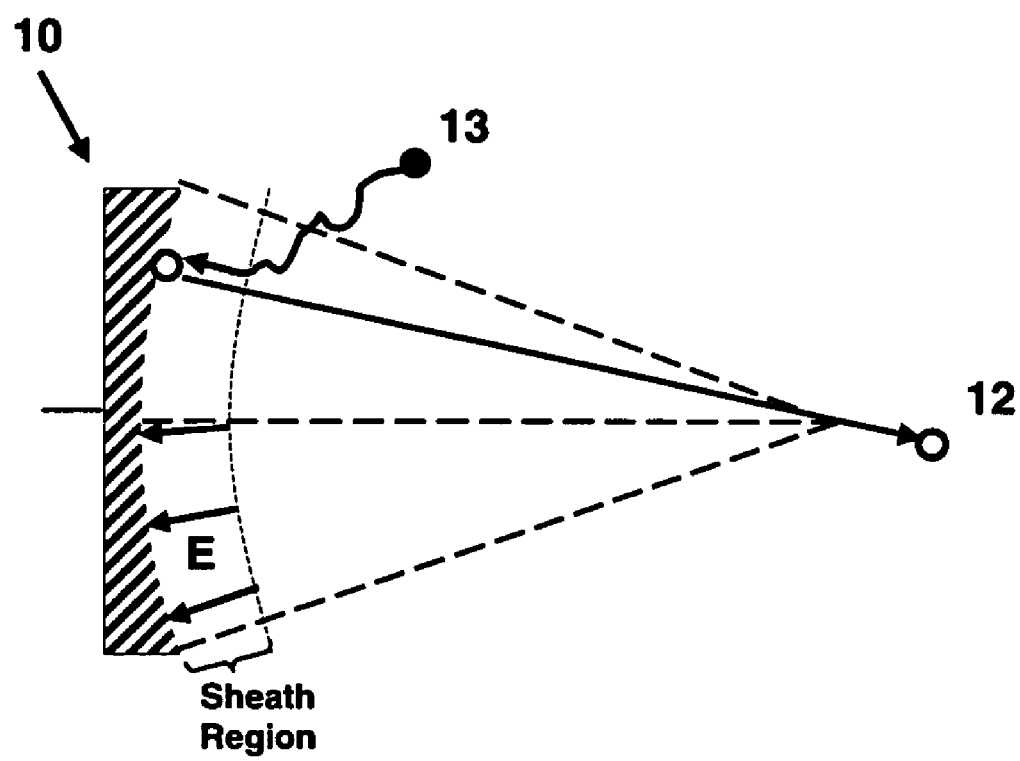
FIG. 3 shows how a curved, electrically-biased high-Z conductive plate is used to produce a focused neutral flux when ions impinge onto its surface.

As previously described with reference to FIG. 2, an ion 2 entering the plasma sheath with kinetic energy much less than the sheath potential will have a trajectory determined by the sheath electric field. The ion will neutralize within a few angstroms of the surface, at the bottom of the sheath potential. Since the electric field is perpendicular to the conductive surface, the ion 4 will strike the metal surface with a normal incidence, and the neutral will reflect normal to the surface. This can be used to help focus the reflected neutral beam. An example is shown in FIG. 3 where a curved high-Z conductive plate 10 that is biased is used to produce a focused neutral flux 12 when a thermal ion 13 impinges the conductive plate 10.

The present invention, using the phenomena described above, discloses specific devices whereby ions are actively attracted to specific locations on a spacecraft surface. The ions impact these surfaces, and are then reflected as high-velocity neutral atoms or molecules. In this manner the contaminant ions are actively removed from the spacecraft neighborhood.

The general technique calls for the installation of conductive patches at selected locations around the spacecraft and then biasing these patches negatively relative to the spacecraft electrical potential. Contaminant ions within a Bohm sheath distance will be electrostatically attracted to these patches, neutralized, and reflected away from the spacecraft in a highly directional beam. The directed velocity of the neutrals away from the spacecraft has the added advantage that they will be less likely to be re-ionized and re-accelerated into the spacecraft.

If significant sputtering occurs at the neutralizing plate, the system would not be able to efficiently direct these effluents away from the spacecraft. To minimize the potential for this effect, use is made of high atomic mass materials or dopants, or the use of low sputter material. Since spacecraft contaminants tend to be primarily low atomic number materials such as polymers, sputtering of the neutralizing plate should not be a significant issue.

Figure 4:
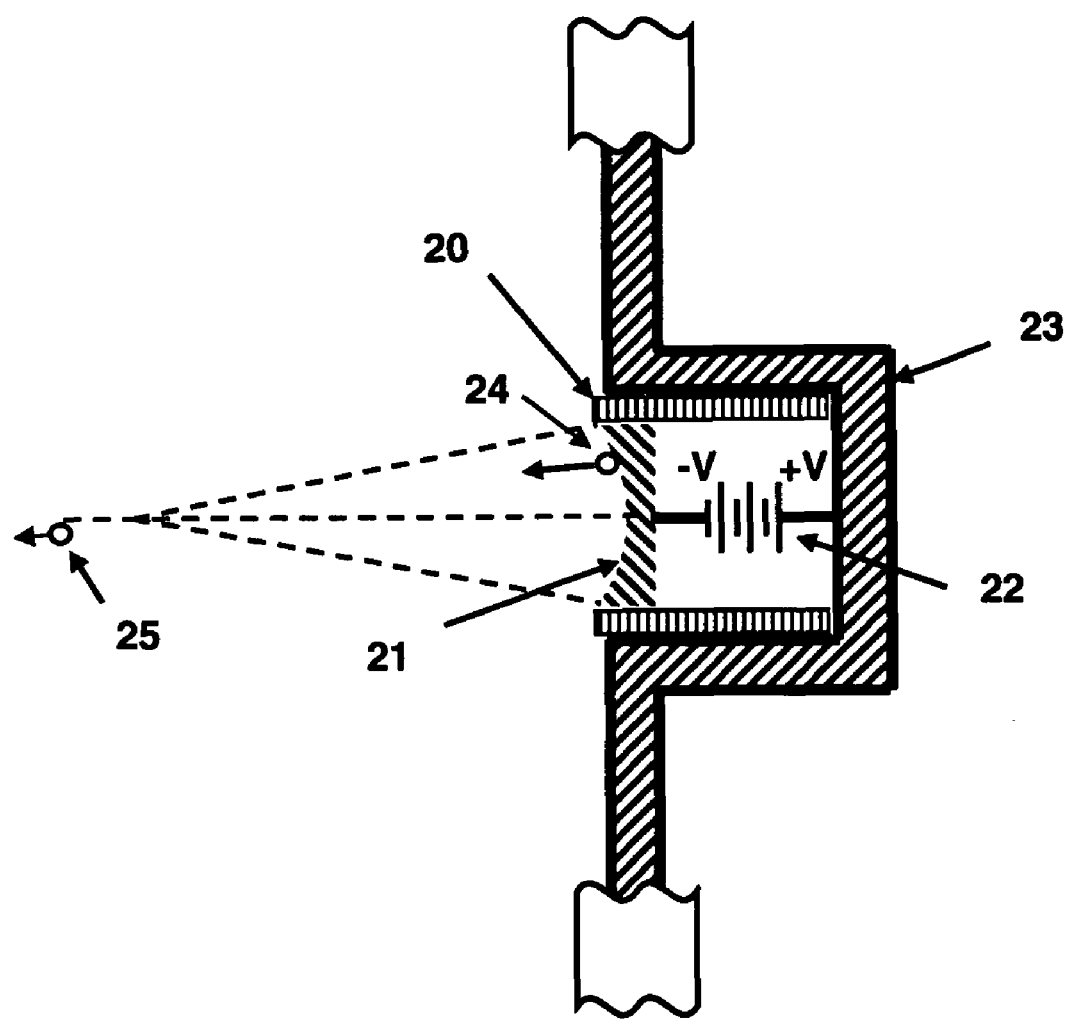
FIG. 4 is a diagram of an ion-neutralizing device imbedded in the surface of a spacecraft.

One preferred embodiment of the technique is shown in FIG. 4 in which a specific area of the spacecraft is protected by the neutralizing device. For example, the component shown in FIG. 4 could be placed next to sensitive spacecraft optics or interspersed within the solar arrays. In this embodiment, an electrically isolated 20 concave conductive plate 21 is biased negative 22 relative to the surrounding spacecraft surfaces 23. Ions 24 within a Bohm sheath distance of the plate will be accelerated toward the conductive plate 21 by the electric field, neutralized, and reflected away from the spacecraft surface in a directional beam 25. FIG. 4 shows the embodiment with a curved plate 21 for focusing and an internal battery 22 for the electrical biasing. The design could also use a plate of any geometry to fit the specific requirements, including a flat plate. The electrical bias could be provided by the spacecraft power system. The entire area of the spacecraft could be protected by a plurality of neutralizing devices located about a satellite's surface.

The range of influence of this technique depends on the size of the plasma sheath. For a low-earth-orbit the plasma density is about $10^5$ cm$^{-3}$, and the temperature is about 0.1 eV. The sheath is a few centimeters and component neutralizers may need to be placed near critical components requiring protection from contamination. However, a significant reduction of ion density from a Debye-sphere volume will have an impact over a much larger volume. As the ions are removed from this volume, thermal pressure will cause neighboring ions, outside the Debye sheath, to replenish this volume and thereby decrease the ion densities over a much larger volume. For geosynchronous orbits, the plasma density is about 1 cm$^{-3}$ with an average temperature of about 2.4 keV. The Debye sheath is less well-defined in this multiple component plasma. However it is clear that sheath plasmas can extend for 100 meters, a distance much greater than the characteristic size of the spacecraft. In this application a single embodiment, such as shown in FIG. 4, can have a significant impact on the entire spacecraft contamination.

Figure 5:
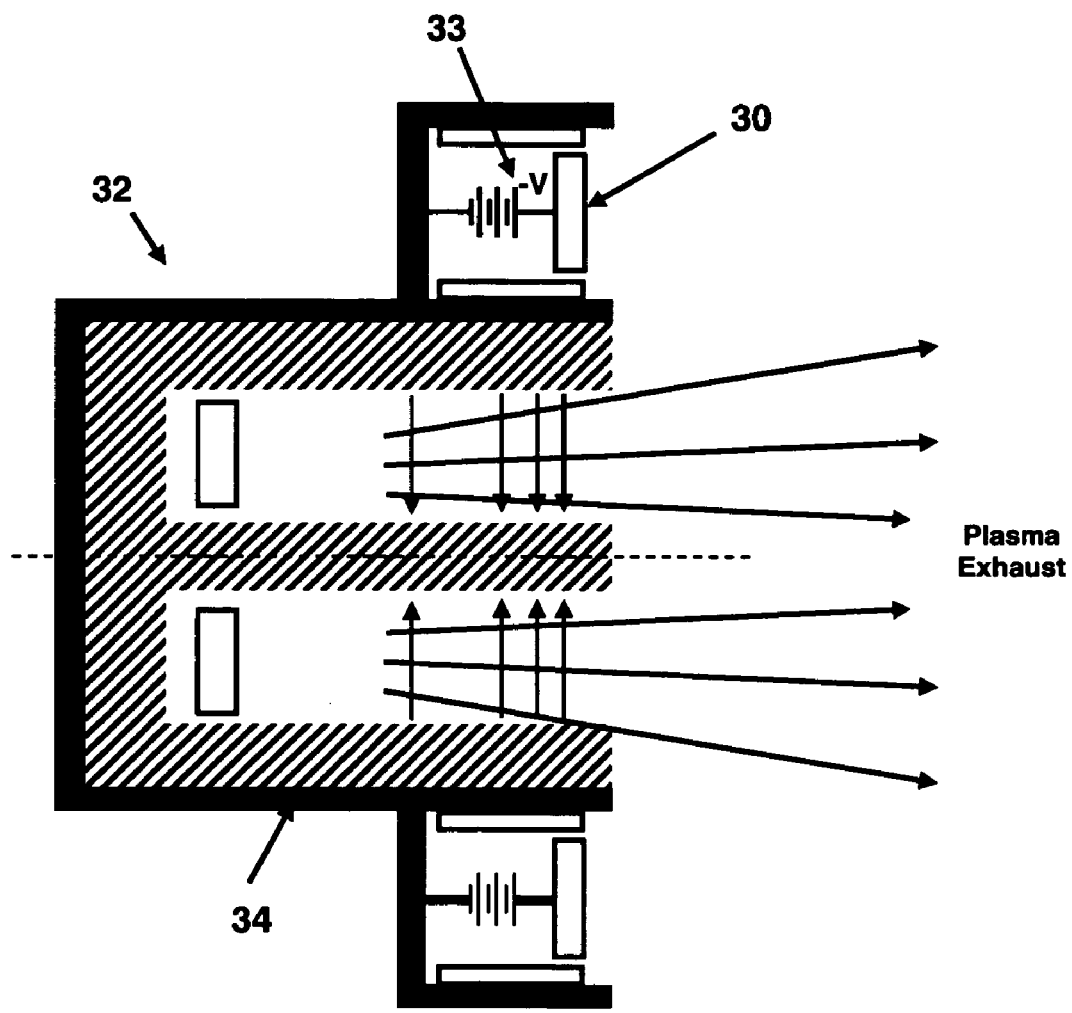
FIG. 5 shows a cross-section of an annular ion-neutralizing device.

A second embodiment is shown in FIG. 5 where the technique is integrated with a component known to be a source of contaminant ions, e.g., a plasma thruster. FIG. 5 shows the annular cylindrical shape of a Hall thruster 32; however, the technique could easily be adapted to any plasma propulsion device including ion thrusters, arcjets, magneto-plasma dynamic thrusters, and resitojets. The primary source of contaminants from this device is slow ions near the exit plane, as discussed previously. In this case, a neutralizing device is disclosed with an annular neutralizer plate 30 (shown in cross-section) surrounding the thruster exit plane. In FIG. 5 the neutralizer plate bias 33 is shown as referenced to an outer spacecraft-grounded casing 34 of the thruster with the bias provided by a battery. The bias may be provided directly from the spacecraft power system. One can also consider a similar embodiment placed around the aperture of a space telescope, such as Hubble.

Figure 6:
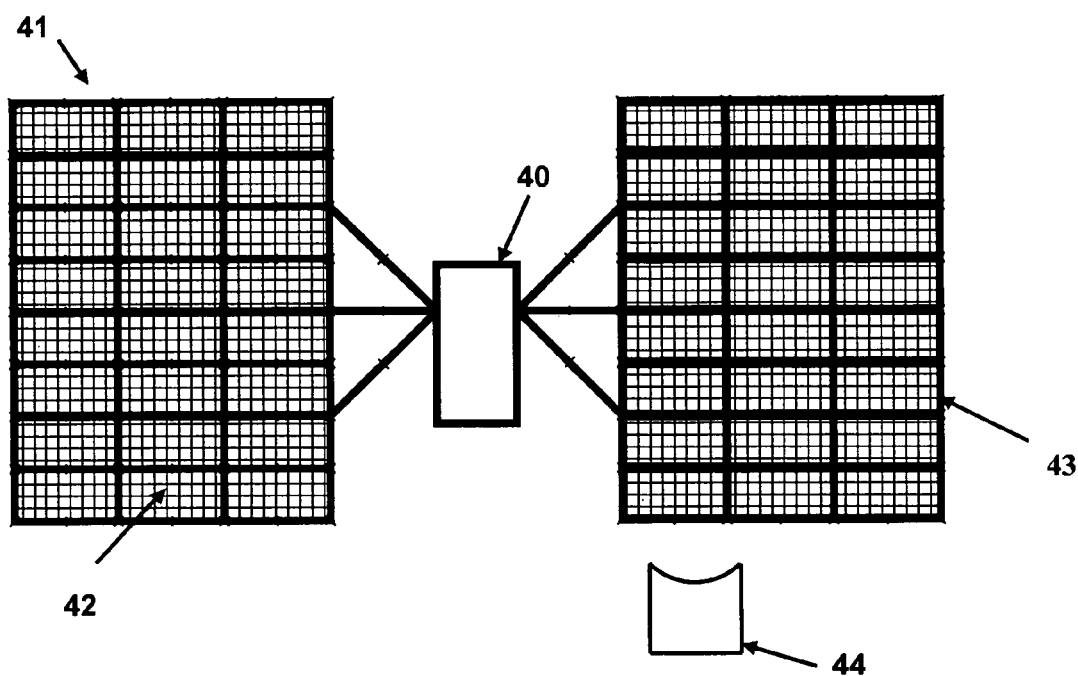
FIG. 6 shows a satellite with the modular structures supporting the solar arrays being used as the biased surface.

A third embodiment of the proposed invention is proposed for large solar arrays presently in development that will use an external support structure to tension the photovoltaic blanket. One such example, shown in FIG. 6, is the PowerSail program where the solar panels 41 attached to the spacecraft 40 are composed of a rectangle of lightweight composite struts 43 used to tension a thin-film photovoltaic blanket 42. A cross-section 44 of the structural element is shown with a curved surface to expel neutralized particles in a beam. The strut structure 43 itself is used for the neutralizer plate. The bias is applied directly to the composite strut structure to attract, neutralize, and reflect ions that would have been initially directed towards the photovoltaic blankets. Bias can be provided either from the spacecraft power system or from a section of the photovoltaics specifically allocated to provide the strut bias.

Ideally the neutralizers can be placed such that the combined Debye sheaths fully encompass the spacecraft, or at least a critical component on the spacecraft. Assuming 50% efficiency in neutralization and reflection, this halves the contamination of the spacecraft surface. This can have the effect of doubling the spacecraft life, or significantly decreasing the thickness and mass of the spacecraft coatings.

The scope of the invention includes all modification, design variations, combinations, and equivalents that would be apparent to persons skilled in the art, and the preceding description of the invention and its preferred embodiments is not to be construed as exclusive of such.

The invention claimed is:

1. A device for neutralizing the positively charged plasma ions in the ambient environment of a spacecraft to prevent the ions from striking and damaging vulnerable surfaces of the spacecraft, the device comprising one or more conducting plates that are located on the surface of the spacecraft, are insulated from the spacecraft's surface, and are maintained at a negative potential relative to the spacecraft's potential, thereby creating an electric field extending several meters into the space beyond the conducting plate causing the plasma ions within the electric field to accelerate toward the plate where they are neutralized by either resonance or Auger neutralization at the plate surface and ejected back into space upon collision with the conducting plate's surface.

2. The ion neutralizing device of claim 1, wherein the conducting plates are concave with respect to the spacecraft's surface, whereby the neutralized ions are ejected back into space in a directed beam.

* * * * *